H. HOENSHELL.
Draw-Bridge Gate.
No. 206,790. Patented Aug. 6, 1878.
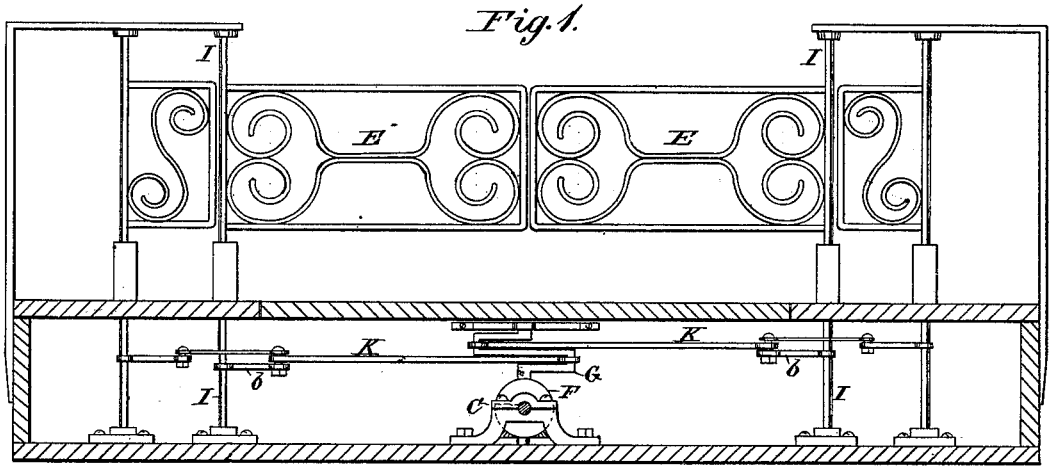
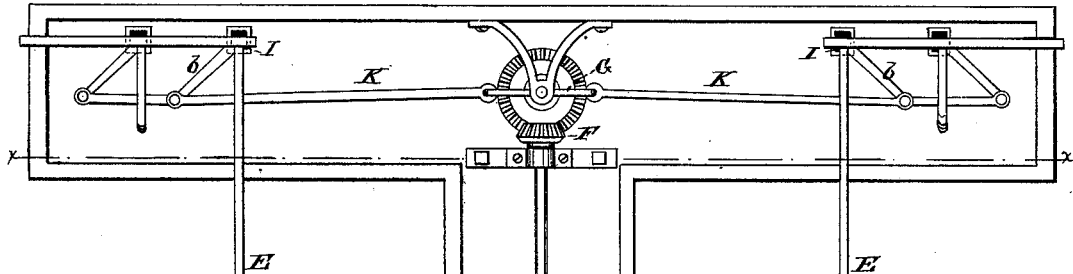
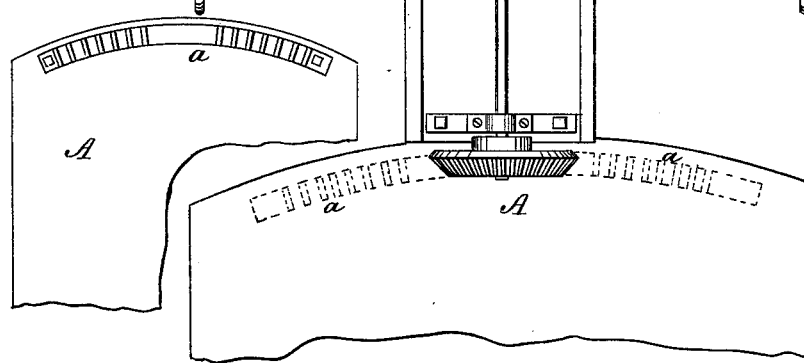
WITNESSES:
W. W. Hollingsworth
Solon C. Kemon
INVENTOR:
H. Hoenshell
BY
ATTORNEYS.

UNITED STATES PATENT OFFICE.

HENRY HOENSHELL, OF STREATOR, ILLINOIS.

IMPROVEMENT IN DRAW-BRIDGE GATES.

Specification forming part of Letters Patent No. 206,790, dated August 6, 1878; application filed April 9, 1878.

*To all whom it may concern:*

Be it known that I, HENRY HOENSHELL, of Streator, in the county of La Salle and State of Illinois, have invented a new and useful Improvement in Automatic Gates; and I do hereby declare that the following is a full, clear, and exact description of the same.

My invention is an improvement in that class of automatic-swinging gates which are particularly adapted for use in connection with pivot-bridges and have operating mechanism so constructed that the gate will open and close in the desired manner, whether the bridge swings in one direction or the other.

My invention is more particularly an improvement upon the gate forming the subject-matter of Patent No. 189,320.

The invention consists in the particular construction and arrangement of parts whereby the gate is located in both the open and closed position, and whereby the bridge is allowed to swing a certain distance before beginning to operate the gate mechanism, as hereinafter described.

In the accompanying drawing, forming part of this specification, Figure 1 is a sectional elevation on line $x$ $x$, Fig. 2. Fig. 2 is a plan view of the apparatus with the top of the box inclosing it removed. Fig. 3 is a plan view of the under side of a fragment of the bridge.

A indicates a fragment of a pivot-bridge, having a curved rack, $a$, attached to its under side, which meshes with a large bevel-gear fixed on one end of the line-shaft C, extending along the street between the bridge A and the gate or gates E. A bevel-gear, F, is fixed on the other end of said shaft C, and meshes with a similar gear on the vertical crank-shaft G.

The gates E are attached to vertical pivot rods or shafts I I, that project the requisite length above the roadway or pavement. The gates are swung horizontally to open and close them by rotating the rods I I; and this is effected through the medium of the vertical double-crank shaft G, connecting-rods K, and the radial arms $b$ $b$, which latter project from the gate pivot-shafts I I at a slight angle to the plane of the gates, so that their outer ends are in line with the double-crank shaft G, which is equidistant from the gate-shafts I I, but not in the same plane, being located at a point nearer pivot of bridge A.

By this arrangement, when the bridge swings in either direction, the line-shaft C will rotate, and communicate similar motion to the double-crank shaft G, thus causing the connecting-rods K to draw the arms $b$ $b$ inward or toward the crank-shaft G and rotate the pivot-rod I a quarter of a revolution, so that the gates E will make a corresponding movement, and assume a position across to the roadway, as shown in Fig. 1.

When the bridge returns to its normal or closed position, the line-shaft C and double-crank shaft G will rotate as before, and cause the rods K to push the arms $b$ $b$ outward, thereby turning the gates back to their original position parallel to the roadway, Fig. 2, and leaving the passage clear.

It will be noted, however, that the arms of shaft G are in line with rods K when the gates are open, and also when they are closed. There is hence a dead-center which cannot be overcome by applying force to the gates, and therefore the latter will be locked when in either position—*i. e.*, open or closed.

The central part of the rack-bar $a$ attached to the bridge A has no teeth, and hence in opening the bridge it moves a short distance before the rack-teeth engage the gear on shaft C. Thus the bridge acquires some momentum before the gate mechanism begins to operate, and for that reason it is more easily started.

What I claim is—

1. The combination, with the bridge, operating shaft C and gate-shafts I I, having arms $b$ $b$ set at an angle to the gates E, of the shaft G, located in a plane of a right line drawn between the wrists of arms $b$ $b$ when the gates are open or closed, and having cranks or arms projecting in opposite directions, and the connecting-rods K, all as shown and described, whereby the gates are locked open or closed, as specified.

2. The combination, with the gate operating shaft C, of the swinging pivot-bridge A, having the interrupted or mutilated rack $a$, as shown and described.

HENRY HOENSHELL.

Witnesses:
MOSES C. HOPPING,
JOEL T. BUCKLEY.